Jan. 5, 1954
C. T. SORENSEN
2,664,835
BUILDING SURFACING MATERIAL
Filed Aug. 11, 1948
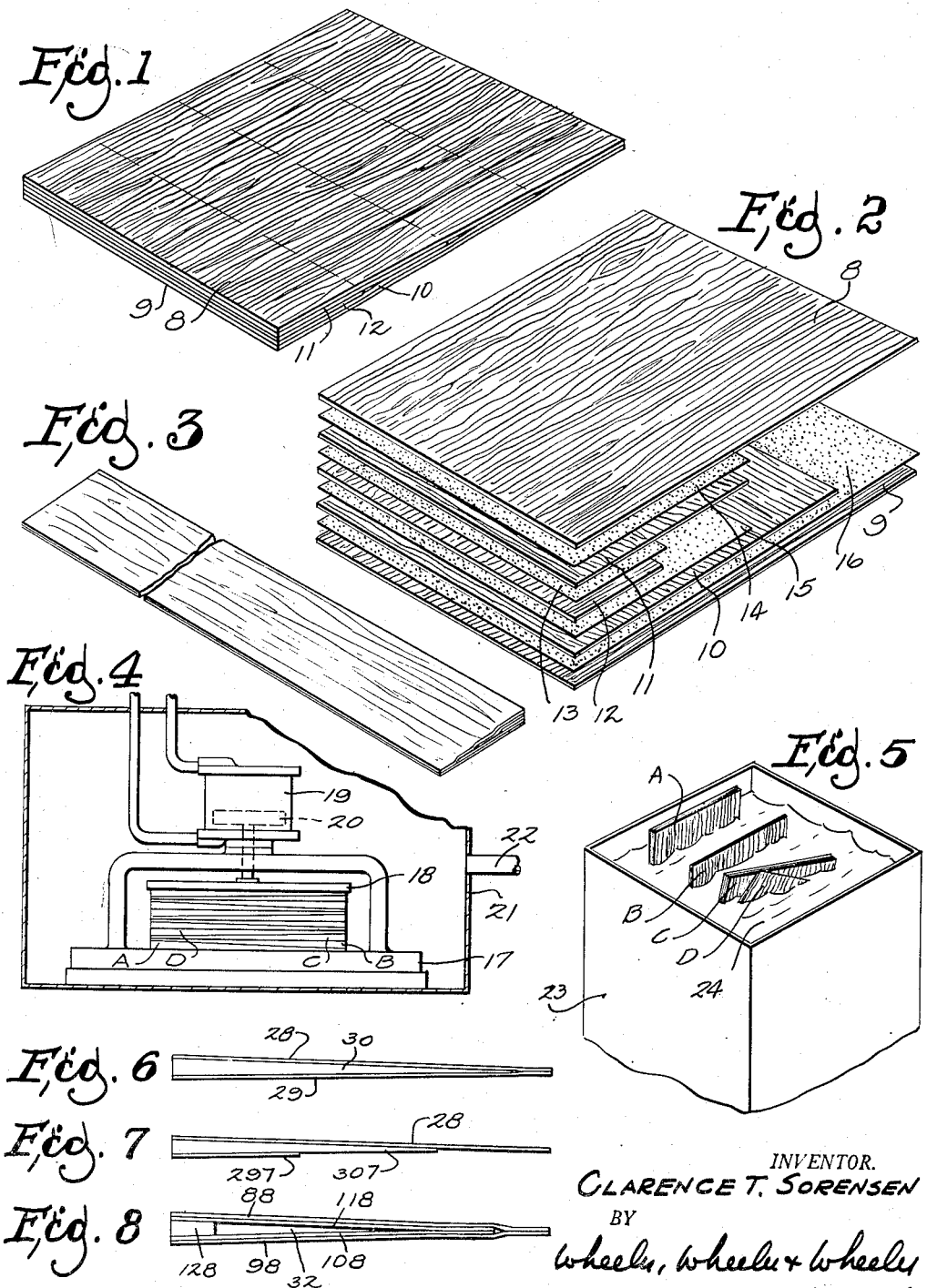
INVENTOR.
CLARENCE T. SORENSEN
BY
Wheeler, Wheeler & Wheeler
ATTORNEYS

Patented Jan. 5, 1954

2,664,835

UNITED STATES PATENT OFFICE 2,664,835

BUILDING SURFACING MATERIAL

Clarence T. Sorensen, Lakewood, Ohio

Application August 11, 1948, Serial No. 43,738

4 Claims. (Cl. 108—8)

This invention relates to a method and product involving a building surfacing material suitable for shingles and siding and the like and comprising laminated wood veneer.

Such laminated material as has heretofore been proposed for use in shingles and siding has not been made of wood. There have been problems in the manufacture of a laminated wood product for this purpose which would be proof against rot and insect damage and warping and yet could be produced at a competitive figure.

It is a primary object of the present invention to solve these problems and to provide a laminated shingle or siding primarily, if not entirely, composed of wood, although the ply exposed to the weather may be natural or enamel coated metal sheet if desired. As indicated above, the invention has to do not only with the method of manufacture but with the resulting article.

Through the use of this invention, it is proposed to produce a greatly improved shingle or siding which is equal in appearance and lasting qualities to tile, slate, or asbestos, and greatly superior to wood or asphalt, and which, nevertheless, can be manufactured at a cost competitive with the cost of natural shingles or siding.

It is a further object to provide a shingle which will afford thermal insulation. Other objects will appear from the following disclosure.

In the drawings:

Fig. 1 is a view in perspective of a finished section of a building finishing material suitable for use either as siding or a shingle, and made in accordance with the present invention.

Fig. 2 is a view in perspective showing in mutually separated positions the several component plies going into the manufacture of the device shown in Fig. 1.

Fig. 3 is a view on a reduced scale fragmentarily illustrating in perspective a piece of siding embodying the invention.

Fig. 4 is a view on a reduced scale showing in side elevation partially completed devices embodying the invention as they appear in a press while subjected to high temperature and pressure, the pressure tank being shown in section.

Fig. 5 is a view in perspective showing a chilling tank in which the units are cooled following their release from the apparatus illustrated in Fig. 4.

Fig. 6 is a detail view in end elevation of a modified embodiment of the invention.

Fig. 7 is a detail view in end elevation of another modified embodiment of the invention.

Fig. 8 is a detail view in end elevation of a further modified embodiment of the invention.

In the construction shown in Figs. 1 and 2, a shingle comprises a top ply 8 and a bottom ply 9, each of which is equal in area to the entire exposed faces of the completed shingle. Ordinarily, these plies, like the other plies used in the interior of the laminated structure, are made of wood veneer. Any wood which will satisfactorily take the adhesive will be usable. I prefer to use the soft woods such as white pine, hemlock and the like for all the plies other than the top or surface ply 8 which is exposed to the weather. For this ply I prefer to use such wood as cypress or cedar but I may also use for the weather ply a thin sheet of metal such as copper or aluminum, stainless steel or enamel coated iron.

Assuming that all of the plies used are made of thin wood veneer, the grain of plies 8 and 9 will preferably extend longitudinally of the shingle, while the grain of the intermediate plies 10 and 11 will extend transversely of the shingle. The grain of the short mid-ply 12 may also extend longitudinally.

It will be noted that the plies 10, 11 and 12 are all of different length. The center ply 12 is the shortest, the ply 11 is approximately one-half the length of the shingle and the ply 10 is about three-quarters the length of the shingle.

According to the preferred process of manufacture, the several plies are interleaved, as shown in Fig. 2, with some suitable adhesive which is desirably moisture resistant as well as fungicidal and insecticidal. As an example of such an adhesive, the most suitable product known to me is an adhesive sold commercially as "Tego" which is a phenol resin in sheet form, comprising tissue-thin leaves. I apply a short tissue-thin leaf of adhesive at 13 on the short center ply 12. The leaves 14 and 15 (Fig. 2) are desirably about the length of ply 11. Leaf 14 is interposed between veneer ply 11 and the weather ply 8, while the sheet of adhesive shown at 15 is interposed between veneer ply 12 and veneer ply 10. A single longer sheet of adhesive tissue is used at 16 between the bottom ply 9 and the intermediate veneer ply 10. It will be apparent from Fig. 2 that sheets of adhesive of the dimensions indicated will bond all surfaces of the laminated product when lamination is accomplished.

The piece of siding shown in Fig. 3 is identical, except in dimensions, with the shingle shown in Fig. 1 and Fig. 2.

The laminations assembled as shown in Fig.

2 for making up a single article according to the invention are next associated with other like assemblies in a press such as that diagrammatically illustrated in Fig. 4. The assemblies A, B, C and D are desirably associated in pairs, with the thicker ends of the respective assemblies in opposite directions so that in each pair the thick end of one assembly is superimposed upon the thin end of another. As many such pairs as desired, within the capacity of the available press, are placed upon the bed 17 of the press and subjected to the pressure of the platen 18 which, for the purposes of the diagrammatic disclosure in Fig. 4, may be operated hydraulically, by means of cylinder 19 and piston 20.

The pressure developed should be at least of the order of 200 pounds per square inch and the material should be held at this pressure for ten minutes while subjected to a temperature of approximately 300 degrees F. This may be done by disposing the press in a closed chamber 21 and admitting steam through pipe 22 directly to such chamber. At this temperature and pressure, the residual moisture in the wood, which amounts to about 7% of its weight, will dissolve the adhesive, causing it to impregnate the wood and to secure the laminations together. The adhesive is also effective to secure to the laminations otherwise made of wood one or both weather plies made of metal; the intervening lamination or laminations of wood, in such a case, providing the moisture and taking up the impregnation.

According to the preferred process of manufacture, the otherwise complete articles A, B, C, D, etc., are immediately immersed in cold water upon their withdrawal from the pressure and temperature step. Fig. 5 diagrammatically illustrates a tank 23 filled with water 24 in which the articles are shown partially immersed.

The articles remain in the vat 24 only for a sufficient time to chill them sharply, after which they are removed and may be packaged for sale. Products so made will last practically forever and, due to the plastic impregnation, will neither rot nor warp nor be subject to attacks by insects. Despite the fact that the items are made of wood, their cost of manufacture by the process herein disclosed is so very low that the articles may be sold at prices very materially lower than natural wood shingles or siding, to which my improved shingles and siding are very much superior in performance.

The plies of veneer are so thin that the resulting shingles or siding do not have the "stepped" effect which might appear in the drawings. They do have virtually imperceptible steps or gradations of thickness at the lines where the center and intermediate plies end, but such changes in thickness are not visually apparent. They are necessarily exaggerated in the drawings. In actual practice, the laminated shingle or piece of siding seems to taper from one margin to the other with substantial uniformity, just like a natural shingle.

In the modified embodiment shown in Fig. 6, only three plies are used. There is a top ply at 28 and a bottom ply at 29 and an intermediate ply 30 which is saw-cut to the form of a wedge from a maximum thickness at the butt of the article to a minimum thickness at its opposite margin. The process of laminating the top and bottom plies 28 and 29 to the wedge-shaped center ply 30 may be identical with that above described. As in the embodiment previously described, the top ply 28, exposed to the weather, will preferably be made of cypress or cedar but may be made of metal.

Fig. 7 shows a construction in which the top ply 28 is identical with that shown in Fig. 6 but the bottom ply 297 is very much shorter and the intermediate ply 307 is of intermediate length. Such an article would not ordinarily employ veneer for the top ply 28 because so much of it is left unlaminated and unsupported at the thin edge of the article. It would, however, be entirely suitable to make this article with a top ply of sheet metal, using a sawed core 307 and a veneer bottom ply 297. The process of assembly lamination and treatment with even pressure may correspond with the method already described, and will preferably be followed by the abrupt cooling step indicated diagrammatically in Fig. 5. Despite the sawing operation which is required for this article, its cost of manufacture is nevertheless surprisingly low since it is not necessary to use high quality wood for the wedge-shaped core or the bottom ply of veneer, the plastic adhesive protecting even soft woods against rot or attack by insects.

Additional thermal insulation results from the construction shown in Fig. 8 where the core member 128 is thicker than that used in Figs. 1 and 3, but of considerable less extent toward the thin margin of the shingle or siding. The weather plies 88 and 98 are desirably co-extensive in area with the finished unit, and the intermediate plies 118 and 168 are somewhat shorter with their grain transverse respecting the grain of the weather plies. This leaves a large air space at 32 in each shingle or strip of siding, which lies beneath the butt portion of the next consecutive surfacing unit, thereby greatly contributing to the thermal insulation of the building in which the surfacing units are employed.

Since my building surfacing units made in accordance with the present invention are weatherproof and so resistant against moisture absorption, decay and insect attack as to last indefinitely, it will be apparent to those skilled in the art that I have provided a very superior product. Yet, as already indicated, the cost of manufacture is surprisingly low. Moreover, since the residual moisture of the wood itself is used to plasticize the synthetic resin used as an adhesive, the resulting product is substantially dry when completed and has and retains a comparatively very high coefficient of thermal insulation, particularly when the air space is provided, as in Fig. 8.

It will, of course, be understood that the various features of the invention are interchangeable as between the several views, any of the units illustrated being adapted to have a metal weather ply such as is shown in Fig. 7, and the use of the various constructions in shingles and siding being identical.

I claim:

1. As a new article of manufacture, a building surfacing unit comprising five plies and including two outer plies substantially coextensive in area with the external dimensions of said unit, a central ply substantially equal in length to one dimension of said unit, its other dimension being only about one-fourth the corresponding dimension of said unit, a first intermediate ply between said central ply and one of said outer plies corresponding in length to one dimension of said unit, its width being approximately one-half that of the corresponding dimension of said unit, a second intermediate ply between said central ply and the other outer ply, the second intermediate ply corresponding in length to said one dimension of the other and corresponding in width to about three-fourths of the said corresponding dimension of said unit, and a synthetic resin adhesive bonding the several plies to each other and at least partially impregnating plies of said unit.

2. The device of claim 1 in which said synthetic resinous adhesive is plasticized with residual moisture of the plies impregnated thereby.

3. The device of claim 1 in which all of the several plies comprise wood veneer and all are impregnated.

4. The device of claim 1 in which one of said outer plies, together with the central and intermediate plies, comprise wood veneer, the other outer ply being sheet metal.

CLARENCE T. SORENSEN.

References Cited in the file of this patent

UNITED STATES PATENTS

| Number | Name | Date |
|---|---|---|
| 322,990 | Sporny | July 28, 1885 |
| 1,449,058 | Robinson | May 20, 1923 |
| 1,674,630 | Beckman | June 26, 1928 |
| 2,106,624 | Ray | Jan. 25, 1938 |
| 2,117,085 | Esminger | May 10, 1938 |
| 2,232,075 | Nevin | Feb. 18, 1941 |
| 2,390,087 | Fink | Dec. 4, 1945 |
| 2,401,987 | Taylor | June 11, 1946 |